US010212460B1

(12) United States Patent
Dorwin et al.

(10) Patent No.: US 10,212,460 B1
(45) Date of Patent: Feb. 19, 2019

(54) METHOD FOR REDUCING TIME TO FIRST FRAME/SEEK FRAME OF PROTECTED DIGITAL CONTENT STREAMS

(75) Inventors: David Kimbal Dorwin, Kirkland, WA (US); Hugh Finnan, Seattle, WA (US)

(73) Assignee: GOOGLE LLC, Mountain View, CA (US)

(*) Notice: Subject to any disclaimer, the term of this patent is extended or adjusted under 35 U.S.C. 154(b) by 790 days.

(21) Appl. No.: 13/538,948

(22) Filed: Jun. 29, 2012

Related U.S. Application Data

(60) Provisional application No. 61/569,755, filed on Dec. 12, 2011.

(51) Int. Cl.
*H04N 21/2347* (2011.01)
*H04N 21/4405* (2011.01)

(52) U.S. Cl.
CPC ..... *H04N 21/2347* (2013.01); *H04N 21/4405* (2013.01)

(58) Field of Classification Search
CPC .......................... H04N 7/025; H04N 21/2347
USPC ......................................................... 709/231
See application file for complete search history.

(56) References Cited

U.S. PATENT DOCUMENTS

| 4,535,355 | A | 8/1985 | Arn et al. |
| 4,694,489 | A | 9/1987 | Frederiksen |
| 5,067,035 | A | 11/1991 | Kudelski et al. |
| 5,134,656 | A | 7/1992 | Kudelski |
| 5,144,663 | A | 9/1992 | Kudelski et al. |
| 5,191,611 | A | 3/1993 | Lang |
| 5,339,413 | A | 8/1994 | Koval et al. |
| 5,375,168 | A | 12/1994 | Kudelski |

(Continued)

FOREIGN PATENT DOCUMENTS

| EP | 0658054 A2 | 6/1995 |
| EP | 0714204 A2 | 5/1996 |

(Continued)

OTHER PUBLICATIONS

"A new approach to browser security: the Google Chrome Sandbox" Chromium Blog, http://blog.chromium.org/2008/10/new-approach-to-browser-security-google.html, 5 pages, Oct. 2, 2008.

(Continued)

*Primary Examiner* — Kevin Bates
*Assistant Examiner* — Chen-Liang Huang
(74) *Attorney, Agent, or Firm* — Brake Hughes Bellermann LLP

(57) ABSTRACT

Embodiments are directed towards managing play of at least one stream of digital content to reduce a time to a first frame or seek frame within the content by playing unencrypted portions of the digital content received at a client device at least until key negotiations and decryption actions are completed for corresponding encrypted digital content, at which point play is switched to the decrypted content in a seamless manner. In one embodiment, the unencrypted content is at a lower quality, resolution, or bit rate than the encrypted content. In one embodiment, the at least one stream is a stream of content that includes at least a first portion that is unencrypted, and a second portion that is encrypted. In another embodiment, the at least one stream includes a first stream that is unencrypted and played until a second, encrypted, stream is readied for play.

12 Claims, 6 Drawing Sheets

(56) References Cited

U.S. PATENT DOCUMENTS

| | | |
|---|---|---|
| 5,392,351 A | 2/1995 | Hasebe et al. |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,974,549 A | 10/1999 | Golan |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,257,786 B1 | 7/2001 | Thomas |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,332,194 B1 | 12/2001 | Bloom et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,460,023 B1 | 10/2002 | Bean et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Weber et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,165,175 B1 | 1/2007 | Kollmyer et al. |
| 7,356,143 B2 | 4/2008 | Morten |
| 7,578,002 B2 * | 8/2009 | Risan et al. .................. 726/32 |
| 7,640,435 B2 | 12/2009 | Morten |
| 7,805,616 B1 | 9/2010 | Mohammed et al. |
| 7,817,608 B2 | 10/2010 | Rassool et al. |
| 7,827,613 B2 | 11/2010 | Koved et al. |
| 7,953,882 B2 | 5/2011 | Shukla et al. |
| 8,457,311 B1 | 6/2013 | Schultz et al. |
| 8,560,642 B2 | 10/2013 | Pantos et al. |
| 2002/0001385 A1 | 1/2002 | Kawada et al. |
| 2002/0015498 A1 | 2/2002 | Houlberg et al. |
| 2002/0021761 A1 | 2/2002 | Zhang et al. |
| 2002/0021805 A1 | 2/2002 | Schumann et al. |
| 2002/0049679 A1 | 4/2002 | Russell et al. |
| 2002/0089410 A1 | 7/2002 | Janiak et al. |
| 2002/0104004 A1 | 8/2002 | Couillard |
| 2002/0107803 A1 | 8/2002 | Lisanke et al. |
| 2002/0141582 A1 | 10/2002 | Kocher et al. |
| 2002/0170053 A1 | 11/2002 | Peterka et al. |
| 2003/0007568 A1 | 1/2003 | Hamery et al. |
| 2003/0037261 A1 | 2/2003 | Meffert et al. |
| 2003/0046568 A1 | 3/2003 | Riddick et al. |
| 2003/0154265 A1 | 8/2003 | Raffaele et al. |
| 2004/0031856 A1 | 2/2004 | Atsmon et al. |
| 2004/0117500 A1 | 6/2004 | Lindholm et al. |
| 2004/0151315 A1 | 8/2004 | Kim |
| 2004/0184616 A1 | 9/2004 | Morten |
| 2004/0230806 A1 | 11/2004 | Lisanke |
| 2005/0027871 A1 | 2/2005 | Bradley et al. |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2006/0005260 A1 | 1/2006 | Haruki et al. |
| 2006/0020811 A1 | 1/2006 | Tan |
| 2006/0212363 A1 | 9/2006 | Peinado et al. |
| 2006/0225107 A1 | 10/2006 | Seetharaman et al. |
| 2006/0280150 A1 | 12/2006 | Jha et al. |
| 2007/0005795 A1 * | 1/2007 | Gonzalez .................. 709/232 |
| 2007/0067321 A1 | 3/2007 | Bissett et al. |
| 2007/0089174 A1 | 4/2007 | Bader et al. |
| 2007/0143210 A1 | 6/2007 | Yeung et al. |
| 2007/0160208 A1 | 7/2007 | MacLean et al. |
| 2007/0204300 A1 | 8/2007 | Markley et al. |
| 2007/0209005 A1 | 9/2007 | Shaver et al. |
| 2007/0219917 A1 | 9/2007 | Liu et al. |
| 2007/0234291 A1 | 10/2007 | Ronen et al. |
| 2007/0294170 A1 | 12/2007 | Vantalon et al. |
| 2008/0027871 A1 | 1/2008 | Seo |
| 2008/0052641 A1 * | 2/2008 | Brown et al. ................ 715/811 |
| 2008/0137848 A1 | 6/2008 | Kocher et al. |
| 2008/0147671 A1 | 6/2008 | Simon et al. |
| 2008/0155586 A1 * | 6/2008 | Yang et al. .................. 725/32 |
| 2008/0155673 A1 | 6/2008 | Jung et al. |
| 2008/0267399 A1 * | 10/2008 | Medvinsky et al. .......... 380/201 |
| 2008/0288611 A1 | 11/2008 | Toyomura et al. |
| 2008/0307454 A1 | 12/2008 | Ahanger et al. |
| 2008/0313264 A1 | 12/2008 | Pestoni |
| 2009/0006862 A1 | 1/2009 | Alkove et al. |
| 2009/0007198 A1 | 1/2009 | Lavender et al. |

(56) References Cited

U.S. PATENT DOCUMENTS

| | | | |
|---|---|---|---|
| 2009/0031408 | A1 | 1/2009 | Thom et al. |
| 2009/0044008 | A1 | 2/2009 | Lim |
| 2009/0144836 | A1 | 6/2009 | Gutta et al. |
| 2009/0183001 | A1 | 7/2009 | Lu et al. |
| 2009/0197238 | A1 | 8/2009 | Moffatt et al. |
| 2009/0208016 | A1 | 8/2009 | Choi et al. |
| 2009/0219994 | A1 | 9/2009 | Tu et al. |
| 2009/0249426 | A1 | 10/2009 | Aoki et al. |
| 2010/0023760 | A1 | 1/2010 | Lee et al. |
| 2010/0027974 | A1 | 2/2010 | Ansari |
| 2010/0145794 | A1 | 6/2010 | Barger et al. |
| 2010/0180289 | A1 | 7/2010 | Barsook et al. |
| 2010/0199104 | A1 | 8/2010 | Van Rijnswou |
| 2010/0211776 | A1 | 8/2010 | Gunaseelan et al. |
| 2010/0235820 | A1 | 9/2010 | Khouzam et al. |
| 2010/0242097 | A1 | 9/2010 | Hotes et al. |
| 2010/0250532 | A1 | 9/2010 | Soroushian et al. |
| 2010/0299701 | A1 | 11/2010 | Liu et al. |
| 2011/0069936 | A1 | 3/2011 | Johnson et al. |
| 2011/0145593 | A1 | 6/2011 | Auradkar et al. |
| 2011/0173524 | A1* | 7/2011 | Chan et al. ............... 715/206 |
| 2011/0179283 | A1 | 7/2011 | Thom et al. |
| 2011/0225417 | A1 | 9/2011 | Maharajh et al. |
| 2011/0238983 | A1* | 9/2011 | Lotspiech et al. ............ 713/165 |
| 2011/0305273 | A1 | 12/2011 | He et al. |
| 2011/0314284 | A1 | 12/2011 | Chou |
| 2012/0066494 | A1 | 3/2012 | Lee et al. |
| 2012/0079578 | A1 | 3/2012 | Dachiraju et al. |
| 2012/0114118 | A1 | 5/2012 | Verma |
| 2012/0117183 | A1 | 5/2012 | Wong et al. |
| 2012/0173884 | A1 | 7/2012 | Patil |
| 2012/0317414 | A1 | 12/2012 | Glover |
| 2012/0331293 | A1 | 12/2012 | Ma et al. |
| 2013/0072126 | A1 | 3/2013 | Topaltzas et al. |
| 2013/0097302 | A9 | 4/2013 | Khedouri et al. |
| 2013/0145406 | A1 | 6/2013 | Baskaran et al. |
| 2013/0174222 | A1 | 7/2013 | Ogle |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 9/2001 |
| EP | 1246463 A2 | 10/2002 |
| JP | 03203432 A | 9/1991 |
| JP | 08335040 A | 12/1996 |
| JP | 10336128 A | 12/1998 |
| JP | 11175475 A | 7/1999 |
| JP | 2000022680 A | 1/2000 |
| JP | 2000196585 A | 7/2000 |
| JP | 2000293945 A | 10/2000 |
| JP | 2001251599 A | 9/2001 |
| WO | 96/06504 A1 | 2/1996 |
| WO | 96/32702 A1 | 10/1996 |
| WO | 99/21364 A1 | 4/1999 |
| WO | 99/28842 A1 | 6/1999 |
| WO | 99/30499 A1 | 6/1999 |
| WO | 99/54453 A1 | 10/1999 |
| WO | 01/35571 A1 | 5/2001 |
| WO | 01/93212 A2 | 12/2001 |
| WO | 02/21761 A2 | 3/2002 |
| WO | 2004/002112 | 12/2003 |

OTHER PUBLICATIONS

"Conditional access," Wikipedia, the free encyclopedia, http://en.wikipedia.org/wiki/Conditional_access, 8 pages, created Jul. 7, 2005.
"Encrypted Media Extensions, W3C Editor's Draft Dec. 17, 2012," W3C, http://dvcs.w3.org/hg/html-media/raw-file/tip/encrypted-media/encrypted-media.html, 32 pages, created Feb. 22, 2012, current draft dated Dec. 17, 2012.
"Getting Started: Background and Basics—The Chromium Projects," http://chrornium.org/nativeclient/getting-started/getting-started-background-and-basics, 4 pages, Sep. 2, 2008.
"Google Native Client," Wikipedia, the free encyclopedia, http://en.wikipedia.org/wiki/Google_Native_Client, 6 pages, created Dec. 9, 2008 .
"HTML.5," Wikipedia, the free encyclopedia, http://en.wikipedia.org/wiki/HTML5, 9 pages, created Nov. 16, 2006.
"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated December 18, 2012.
"Media Source Extensions," http://html5-mediasource-api.googlecode.com/svn/trunk/draft-spec/mediasource-draft-spec.html, 1 page, Jul. 11, 2011.
"MediaSource Extensions v0.3," editor A. Colwell, http://htm15-mediasource-api.googlecode.com/svn/tags/0.3/draft-spec/mediasource-draft-spec,html, 14 pages, Mar. 13, 2012.
"Multimedia over Coax Alliance," Wikipedia, the free encyclopedia, http://en.wikipedia.org/wiki/Multimedia_over_Coax_Alliance, 4 pages, created Jun. 11, 2006.
"Sandbox—The Chromium Projects," http://dev.chromium.org/developers/design-documents/sandbox, 8 pages, Sep. 2, 2008.
"W3C HTML Working Group," http://www.w3.org/html/wg, 9 pages, May 9, 2007.
"Web Cryptography Working Group Charter," W3C Technology and Society domain, http://www.w3.org/2011/11/webcryptography-charter.html, 6 pages, Apr. 3, 2012.
Barth, A. et al.; "The Security Architecture of the Chromium Browser," Technical Report, Stanford University, 2008.
Glazkov, D., "What the Heck is Shadow DOM?," http://glazkov.com/2011/01/14/what-the-heck-is-shadow-dom, 14 pages, Jan. 14, 2011.
Metz, C., "Google Native Client: The web of the future—or the past?" The Register, http://www.theregister.co.uk/2011/09/12/google_native_client_from_all_sides/print.html, 13 pages, Sep. 12, 2011.
Yee, B. et at, "Native Client: A Sandbox for Portable, Untrusted x86 Native Code," IEEE Symposium on Security and Privacy, Oakland 2009, 15 pages, May 16-19, 2009.
Official Communication for U.S. Appl. No. 13/437,789 mailed Mar. 26, 2013.
Official Communication for U.S. Appl. No. 13/586,664 mailed Dec. 26, 2013.
Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html.
Official Communication for U.S. Appl. No. 13/437,789 mailed Nov. 13, 2013.
Official Communication for U.S. Appl. No. 13/532,734 mailed Oct. 23, 2013.
Official Communication for U.S. Appl. No. 13/654,271 mailed Oct. 24, 2013.
Official Communication for U.S. Appl. No. 13/654,237 mailed Oct. 23, 2013.
Official Communication for U.S. Appl. No. 13/712,764 mailed Nov. 7, 2013.
"Digital rights management," Wikipedia, the free encyclopedia, last modified Mar. 30, 2012, 30 pages. http://en.wikipedia,org/w/index.php?title=Digital_rights_managernent&printable=yes.
"Establishing Interconnectivity among Various Makers' Products through Standardization of VOD Protocol", NTT Corporation Press Release, Sep. 27, 2002 http://www.ntt.co.jp/newsinews02e/0209/020927,html.
"High-bandwidth Digital Content Protection." Wikipedia, the free encyclopedia, last modified Nov. 12, 2012, 7 pages http://en.wikipedia.org/w/index.php?title=High-bandwidth_Digital_Content_Protection&printable=yes.
"Intelligent Systems for Finance and Business," Goonatilake, S. et al., eds., Chapters 2-10, 1995, pp. 31-173.
"Irdeto Access and Optibase create Strategic Alliance", Press Release, Irdeto Access, Dec. 14, 2000 pp. 1-4 http://www.irdetoaccess.com/press/0000041.htm.
"Irdeto Access and Optibase create Strategic Alliance", Press Release, Optibase, Dec. 14, 2000, pp. 1-2 http://www.optibase.com/html/news/December_14_2000.html.

(56) References Cited

OTHER PUBLICATIONS

"PlayReady," Wikipedia, the free encyclopedia, last modified Jan. 30, 2012, 2 pages http://en.wikipedia.org/w/index.php?title=PlayReady&printable=yes.
"Scalable Video Coding," Wikipedia, the free encyclopedia, last modified Sep. 10, 2012, 4 pages http://en.wikipedia.org/w/index.php?title=Scalable_Video_Coding&printable=yes.
"UltraViolet (system),"Wikipedia, the free encyclopedia, last modified Feb. 20, 2012, 5 pages http://en.wikipedia.org/w/index.php?title=UltraViolet_(system)&printable=yes.
"What is HDCP (high definition copy protocol)?" Digital Connection, 2005, 2 pages http://www.digitalconnection.com/FAQ/HDTV_12.asp.
Balthrop, J. et al., "Coverage and Generalization in an Artificial Immune System", Proceedings of Genetic and Evolutionary Computation Conference (GECCO), 2002, pp. 1-8.
Blumenfeld, S. M., "Streaming Media—System Security," Broadcast Engineering Magazine, Oct. 2001, pp. 1-2.
Canadian Examiner Report for Application No. 2,559,323 mailed May 6, 2008, 3 pages.
Cheng, H. C. H., "Partial Encryption for Image and Video Communication", Department of Computing Science, University of Alberta, Fall 1998, pp. 1-87.
Cheng, H. at al.. "Partial Encryption of Compressed Images and Videos", IEEE Transactions on Signal Processing, vol. 48, No. 8, Aug. 2000, pp. 2439-2451.
Deitcher, D., "Secure Implementations of Content Protection (DRM) Schemes on Consumer Electronic Devices," Discretix, White Paper, May 2011, 17 pages.
Eskicioglu, A. M. et al., "An Overview of Multimedia Content Protection in Consumer Electronics Devices", SP:IC, vol. 16 No. 7, Apr. 2001, pp. 681-899.
Ferrill, E. et al., "A Survey of Digital Watermarking", Feb. 25, 1999, 15 pages. http://elizabeth.ferrill.com/papers/watermarking.pdf.
Forrest, S., "Research Projects," Dec. 2, 2003, pp. 1-3 http://www.cs.unm.edu/.about.forrest/projects.html.
Goodman, J. at al., "Low Power Scalable Encryption for Wireless Systems", Wireless Networks, No. 4, 1998, pp. 55-70.
Griwodz, C. et al., "Protecting VoD the Easier Way", ACM Multimedia, Bristol, UK, Jan. 1998, pp. 21-28.
Griwodz, C., "Video Protection by Partial Content Corruption", Multimedia and Security Workshop at ACM Multimedia, Bristol, UK, Sep. 1998, pp. 1-5.
Hunter, J., et al., "A Review of Video Streaming Over the Internet", DSTC Technical Report TR97-10, Aug. 1997, pp. 1-28.
International Search Report and Written Opinion for International Patent Application No. PCT/US07/62055 mailed Sep. 11, 2007.
Kirovski, D. et al, "Digital Rights Management for Digital Cinema", Proceedings of the SPIE, Bellingham, VA, vol. 4472, Jul. 31, 2001, p. 105-120.
Office Action for European Patent Application No. 05250968.4 mailed Jan. 26, 2006.
Official Communication for Chinese Patent Application No. 2004800071571 mailed Apr. 13, 2007.
Official Communication for European Patent Application No. 04757582.4 mailed May 22, 2007.
Omneon Video Networks Product Announcement, "Broadband Streaming—Omneon and BSkyB", TB-1006-1, created 2002, pp. 1-4.
Schulzrinne, H., et al., "Real Time Streaming Protocol (RTSP)," RFC 2326, Apr. 1998, pp. 1-86.
Schulzrinne, H., et al., "RTP: A Transport Protocol for Real-Time Applications", RFC 1889, Jan. 1996, pp. 1-75.
Search Report for European Patent Application No. 05250968.4 mailed Oct. 12, 2005.
Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10
Supplementary European Search Report for European Patent Application No. 00986215 dated Nov. 14, 2005.
Supplementary European Search Report for European Patent Application No. 04757582.4 mailed Nov. 20, 2006.
Teixeira, L. M. et al, "Secure Transmission of MPEG Video Sources", Proceedings of IEEE Workshop on ISPACS. Nov. 6, 1998, pp. 1-5.
Wu, T.-L. et al., "Selective Encryption and Watermarking of MPEG Video (Extended Abstract)", submitted to International Conference on Image Science, Systems, and Technology, Feb. 17, 1997, 10 pages.
Yoshida, K. et al., "A Continuous-Media Communication Mrthod for Minimizing PLayback Interruptions", IS&T/SPIE Conference on Visual Communications and Image Processing, San Jose, California, vol. 3653, Jan 1999, 10 pages.
Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.
Official Communication for U.S. Appl. No. 13/437,789 mailed Aug. 14, 2013.
Official Communication for U.S. Appl. No. 13/586,664, mailed Jun. 20, 2013.

* cited by examiner

METHOD FOR REDUCING TIME TO FIRST FRAME/SEEK FRAME OF PROTECTED DIGITAL CONTENT STREAMS

CROSS-REFERENCE TO RELATED APPLICATION

This application is a utility patent application based on previously filed U.S. Provisional Patent Application, Ser. No. 61/569,755 filed on Dec. 12, 2011, the benefit of which is hereby claimed under 35 U.S.C. §119(e) and incorporated herein by reference.

TECHNICAL FIELD

The present embodiments relate generally to managing play of digital content and, more particularly, but not exclusively, to reducing a time to a first frame or a seek frame within the digital content based on accessing digital content that may be unencrypted and played at a client device until key negotiations and decryption actions are completed for encrypted digital content, and then replacing the playing digital content with the decrypted content in a seamless manner.

BACKGROUND

Movies, music, and other forms of digital content are provided to our computers over the Internet virtually everyday. We receive news, education, and entertainment, as well as many other forms of digital content. Much of this digital content is streamed to our computers. However, when the digital content is encrypted, we might not be able to immediately play the stream of content. Instead, decryption keys and/or licenses may need to be negotiated. The received encrypted content may then need to be decrypted. Each of these activities may result in a delay before the received content may be played at our computers. When the communications with a content provider is over a slow bandwidth connection, further delays may result before the content is ready for play. Similar problems may arise, when we wish to seek to play the content at a position other than a start position, such as might arise when we wish to "skip ahead" in the content. In any event, the combination of delays before the content is ready for play may be annoying, or otherwise unsatisfactory. Therefore, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
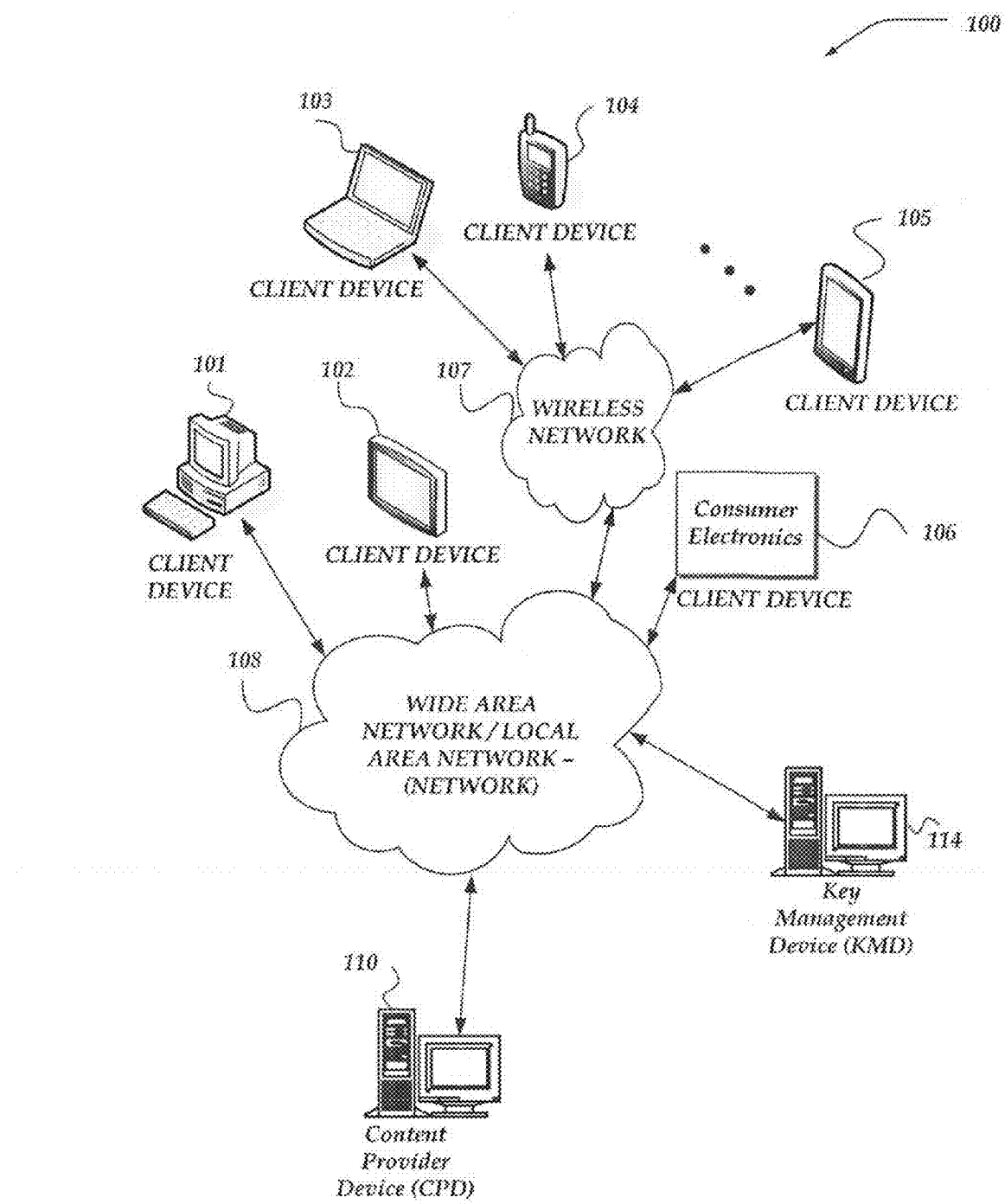
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, or slices, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay Per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms.

As used herein, the term "streaming digital content" refers to digital content constantly received by and prepared for presentation for play at a client device while being delivered by a provider, typically over a network such as the Internet. With streaming, the client device can start playing the digital content before the entire content stream has been transmitted/received at the client device.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys usable for decrypted the differently encrypted digital content may be rotated, reused, or renegotiated.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards managing play of at least a portion of at least one stream of digital content to reduce a time to a first frame or to a seek frame within the content by playing digital content received at a client device unencrypted at least until key negotiations and decryption actions are completed for corresponding encrypted digital content. The decrypted digital content then replaces the playing unencrypted content in a seamless manner. In one embodiment, the unencrypted content is at a lower quality, resolution, or bit rate than the encrypted content. In one embodiment, the at least one stream is a stream of content that includes at least a first portion that is unencrypted, and a second portion that is encrypted. In another embodiment, the at least one stream includes a first stream that is unencrypted and played until a second, encrypted, stream is readied for play. As described further below, by playing portions of received unencrypted content, key rotations may also be accomplished with a minimal play delay.

It should be noted that references to a first frame includes both a first frame of video/audio content for play within a content stream, but also include a first frame after a seek/bookmark/or other selection position.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 108, wireless network 107, client devices 101-106, Content Provider Device ("CPD") 110, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any Internet-based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Audio Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more-than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide at least one stream of digital content to a client device. In one embodiment, at least some portions of the at least one stream may be encrypted, while at least some other portions of the at least one stream may be unencrypted. As discussed further below, in one embodiment, the at least one stream includes at least two streams of digital content—a first stream that is unencrypted, and a second stream that is encrypted, both streams having a representation of the same digital content. In one embodiment, the unencrypted stream may be encoded at a lower quality level, a lower resolution, or even a lower bit rate than the encrypted stream. In another embodiment, CPD 110 may provide a single stream where at least a first portion of the stream is unencrypted, and at least one other portion of the stream is encrypted. Further, in some embodiments, at least one portion of the unencrypted portions in the single stream may be encoded at a lower quality level, a lower resolution, or even a lower bit rate than an encrypted portion in the single stream. In still another embodiment, the unencrypted stream might be a portion less than the full content. For example, the unencrypted stream portion might be about one minute in duration out of a two hour stream.

It should be readily recognized that CPD 110 is configured to operate on behalf of a content owner, distributor, or similar business entity. However, while used herein to represent such network devices usable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a-single environment, and other configurations, and architectures are also envisaged.

In one embodiment, CPD 110 may also be configured to manage license requests, and/or access to decryption keys usable to decrypt portions of the encrypted digital content by a client device for play based on the license.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, ElGamal, or the like. Similarly, various possible symmetric key technologies include, but are not limited to, Twofish, Serpent, AES (Rijndael), Blowfish, CAST5, RC4, 3DES, and IDEA, to name just a few. Moreover, the content may be encrypted using a combination of symmetric and asymmetric key technologies. For example, a symmetric content decryption key might be used to encrypt/decrypt the content, and an asymmetric key technology might be used to encrypt/decrypt the content decryption key.

KMD 114 represents one of a variety of network devices for managing access to symmetric and/or asymmetric keys. In one embodiment, KMD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, KMD 114 may then operate as a trusted third party. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from a content provider, or the like, and based on various criteria, elect to make accessible the public key through a certificate that KMD 114 digitally signs. In one embodiment, access to the public key may enable an authorized client device to decrypt a content key that may then be used to decrypt at least a portion of the encrypted content.

In one embodiment, KMD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

It should be understood, that while KMD 114 is illustrated as a separate device from CPD 110, in other embodiments, the functions of these devices may be integrated.

Although FIG. 1 illustrates KMD 114 as single computing devices, the invention is not so limited. For example, one or more functions of KMD 114 may be distributed across one or more distinct network devices. Moreover, KMD 114 is not limited to a particular configuration. Thus, in one embodiment, KMD 114 may contain a plurality of network devices. Similarly, in another embodiment, KMD 114 may contain a plurality of network devices that operate using a master/slave approach, where one of the plurality of network devices operates to manage and/or otherwise coordinate operations of the other network devices. In other embodiments, the KMD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
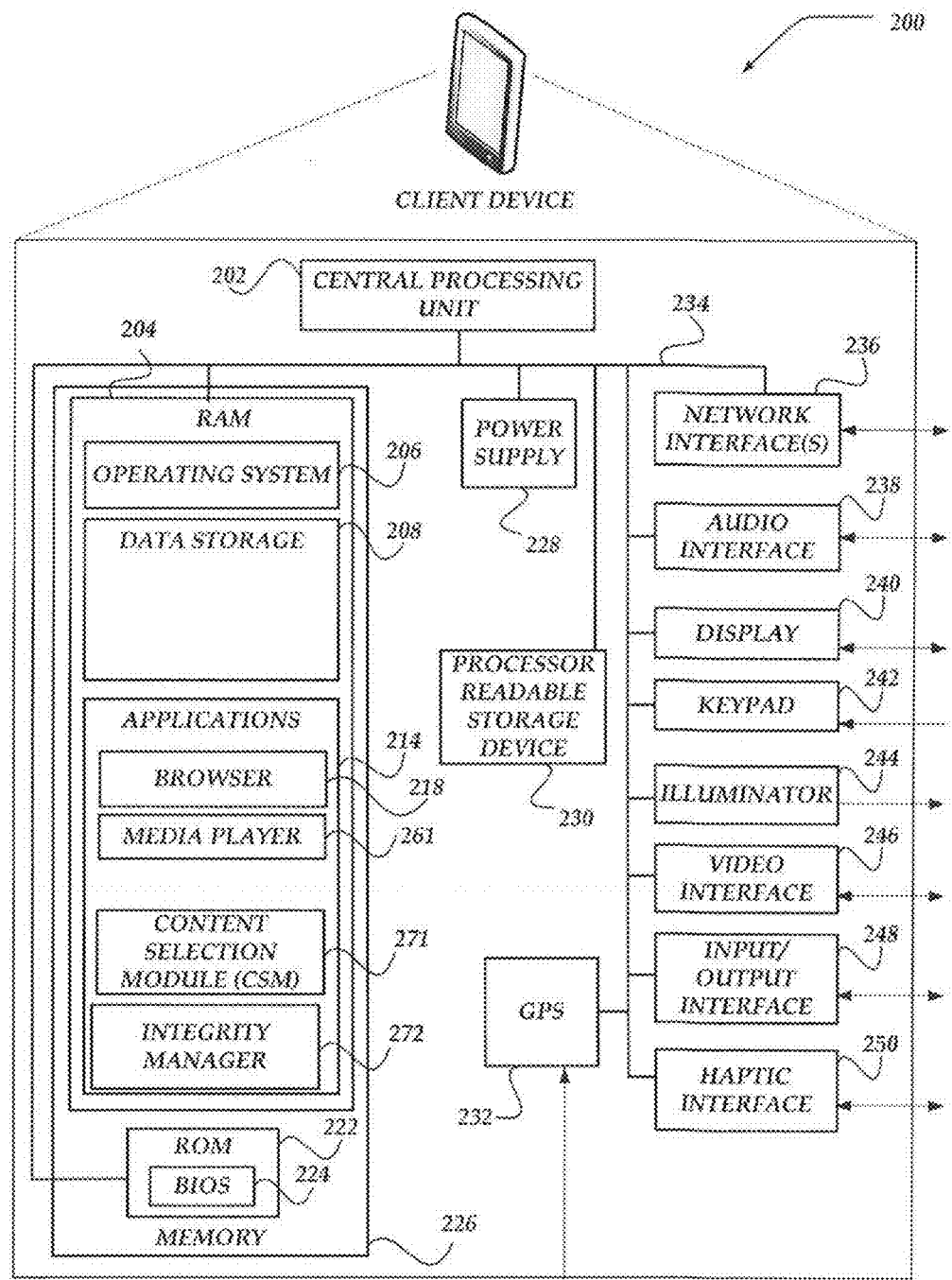
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms usable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, media player 261, Content Selection Module 271, and integrity manager 272.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content. Thus, other user agents may also be included within client device 200.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content. Although illustrated separate from browser 218, in another embodiment, media player 261 may be part of, a plug-in to, or otherwise used with browser 218.

CSM 271 represents any of a variety of software and/or hardware configurations arranged to receive at least stream of digital content, where at least some portions of the at least one stream is encrypted and at least some other portions of the at least one stream is unencrypted. Then, based on various rules, rights, and the like, CSM 271 may provide at least a first portion of the unencrypted content to media player 261 for play. In one embodiment, media player 261 might receive the at least a first portion of the unencrypted content in a coded or compressed form. Media player 261 may then decode and/or decompress the received portion of content stream such that the unencrypted content is readied for play virtually as soon as it is received.

Thus, CSM 271 may operate as an adaptive streaming manager with knowledge about stream encryption. Moreover, in one embodiment, CSM 271 may use another module to request keys/licenses, handle decryption, or the like. CSM 271 may also be included within media player 261, and/or be a plug-in to, part of, or otherwise used in conjunction with browser 218. In another embodiment, CSM 271 may operate as a web application.

CSM 271 may, while the unencrypted first portion of the content stream is playing, negotiate a license and/or decryption keys usable to decrypt and/or provide at least a portion of the decrypted content to media player 261 for play. In one embodiment, CSM 271 may identify a frame within the decrypted content that corresponds to a frame being played or to be played at the media player 261. In one embodiment, the frame may be so identified by matching frames sent to the media player 261 for play. CSM 271 may then, seamlessly switch providing the unencrypted content, replacing it with the decrypted content, such that the media player 261 may continue playing content in a manner that appears to be at a location in the decrypted content that coincides with a then currently playing location in the unencrypted content. That is, CSM 271 may be configured to synchronize the switch between unencrypted content and decrypted content provided to media player 261 to minimize any visual side-effects of a transition. By employing the unencrypted content, it is expected that media player 261 may initiate content play with minimal or no time to first frame play. CSM 271 may perform similar actions, as described further below to minimize delays to play the streaming content, based on key rotations, or seek requests to other sections of a content stream. CSM 271 may employ processes such as disclosed below in conjunction with FIGS. 4-5 to perform at least some of its actions.

However, other embodiments may employ unencrypted fragments of files, such at common or defined seek locations/chapters, or around key rotation points. In these embodiments, the quality of the streams may remain the same, but does not expose the entire content stream. CSM 271 would then know where these fragments cover and uses them as appropriate.

In still other embodiments, time-limited URLs may be employed such that the entire content stream may be available unencrypted, but a given user might only be able to view a small slice or fragment of the stream before the encrypted version is used.

Integrity manager 272 represents any of a variety of mechanisms configured to monitor an integrity of various components of client device 200, and notify at least CSM 271 of any detected compromises to the integrity of the examined components. Integrity manager 272 may, for example, perform various security checks to determine whether a hacker product, a virus, a Trojan horse, or any of a variety of suspect products is detected on client device 271. Integrity manager 272 may also perform various security checks to determine whether various components have been modified improperly. For example, integrity manager 272 may perform security analysis on media player 261, operating system 206, browser 218, and CSM 271 to determine whether any of these components have been improperly modified. When integrity manager 272 determines that an integrity of any of the various components has been compromised, it may send a message to at least CSM 271. In one embodiment, integrity manager 272 and/or CSM 271 may then select to inhibit decryption and/or play of a content stream by media player 261. Further, in at least one embodiment, decryption keys, licenses, or the like, may also be locked or otherwise restricted from access. In one embodiment, the decryption keys, licenses, or even received content might be destroyed or otherwise rendered inaccessible.

While CSM 271 and integrity manager 272 are shown as separate entities, in one embodiment, CSM 271 and integrity manager 272 may be integrated into a single component. Moreover, CSM 271 and/or integrity manager 272 may be integrated into media player 261, and/or into browser 218. Thus, it should be understood that the architecture illustrated for client device 200 of FIG. 2 is not to be construed as limiting or otherwise restrictive of other embodiments usable to reduce a time to a first frame, or seek frame of streaming content.

Illustrative Network Device

Figure 3:
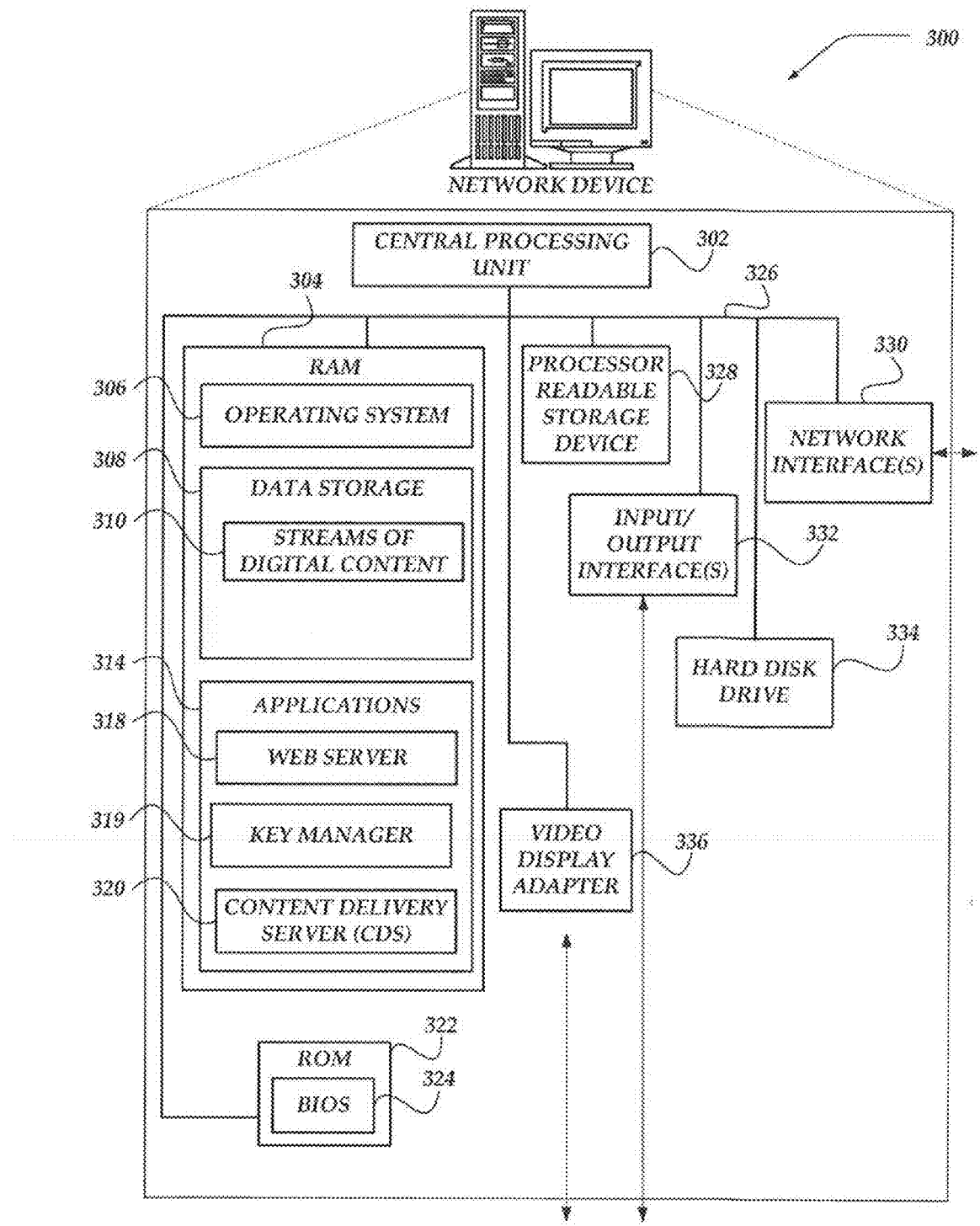
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 110 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store streams of digital content 310. Streams of digital content 310 represent any of a variety of content that may be protected from access using a license, encryption, and/or the like. In some embodiments, streams of digital content 310 may include a plurality of available versions of content. In one embodiment, the available versions may include one or more video tracks and/or one or more one or more audio tracks. In some embodiments, each video track may be in a different video format, quality, or the like. In other embodiments, each audio track may be in a different audio format, quality, audio language, or the like. Various non-limiting, non-exhaustive examples of streams of digital content 310 are described in more detail below in conjunction with FIG. 6.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of digital content 310, and select content for display/play on the client device.

Key manager 319 is configured to manage negotiations of decryption keys and/or licenses for content streams. In one embodiment, key manager 319 may provide decryption keys and/or licenses to KMD 114 of FIG. 1. In other embodiments, key manager 319 may perform negotiations directly with a client device. In one embodiment, key manager 319 may select one or more content decryption keys for use in encrypting different portions of a content stream.

In at least one embodiment, key manager 319 may also be configured to selectively encrypt different portions of a single content stream, such that at least a first portion of the single content stream is unencrypted, while at least one other portion is encrypted. In another embodiment, key manager 319 might reside in another device such that the encryption may be performed, for example, during packaging, encoding, or the like, prior to providing the content to network device 300.

Key manager 319 may also be configured to manage keys, revoke a license, and/or invalidate one or more decryption keys, based, for example, on an unauthorized request for a license, key, or even based on receiving an indication that an integrity of a requesting client device is determined to be compromised.

Content Delivery Server (CDS) 320 is configured to manage access to streams of digital content 310. In one embodiment, the content may be protected through a license. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

Moreover, in at least one embodiment, network device 300 may be configured to provide to a client device, such as shown in FIGS. 1-2, a content selection module (CSM) 271 and/or integrity manager 272. For example, during an initial registration with a content provider device, such as CPD 110 of FIG. 1, or the like, network device 300 may provide for download, or any other form of access, CSM 271, and/or integrity manager 272. The receiving client device may then install for execution such components for use with various embodiments described herein. In still another embodiment, CSM 271 may be implemented in the form of a web application/HTML application, or the like.

General Operation

Figure 4:
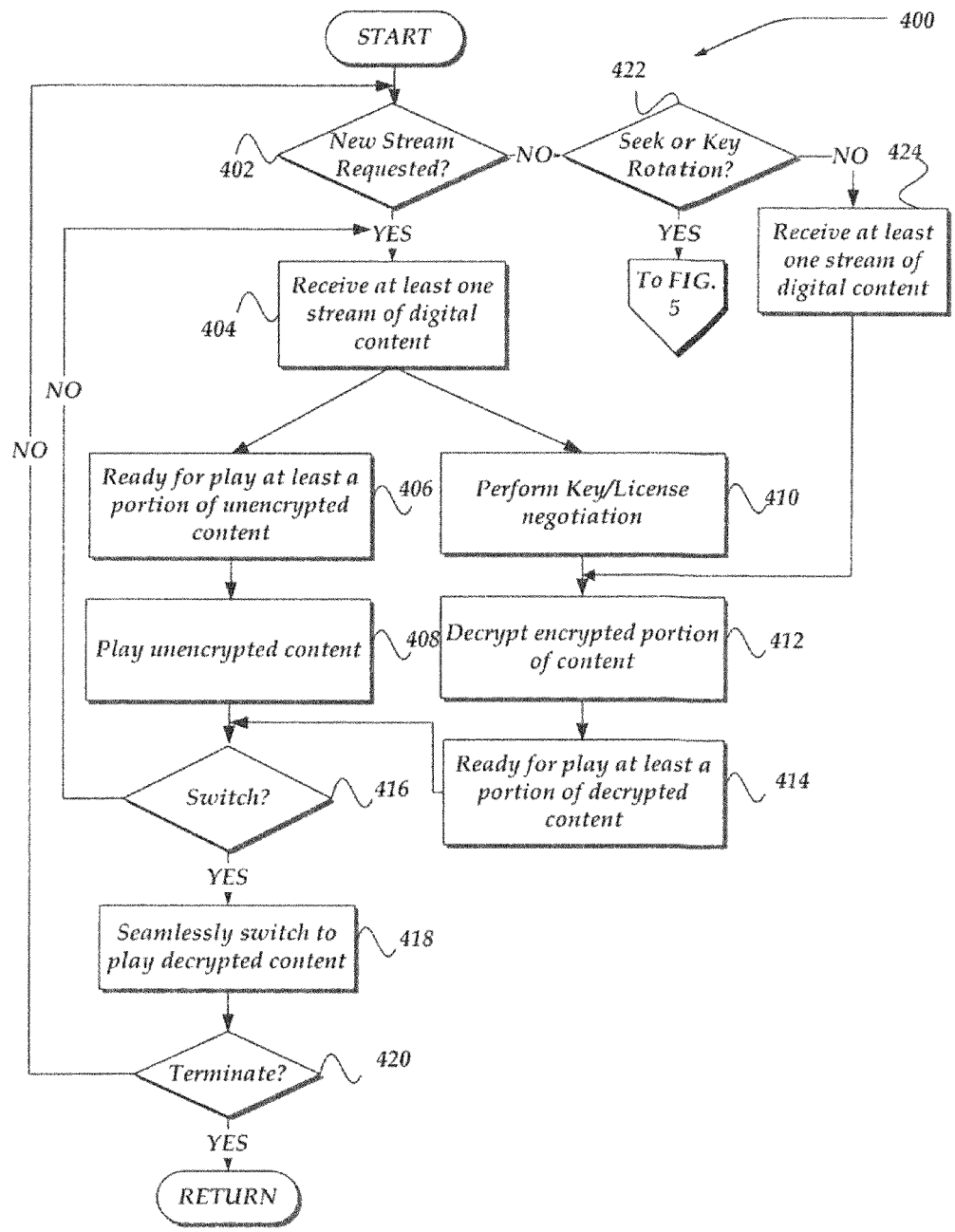
FIG. 4 illustrates one embodiment of a flow diagram usable to manage play of new content stream requests.

The operation of certain aspects of various embodiments will now be described with respect to FIGS. 4-5. FIG. 4 illustrates one embodiment of a flow diagram usable to manage play of new content stream requests. Process 400 of FIG. 4 may be performed within a client device, such as client devices 101-106 of FIG. 1, or client device 200 of FIG. 2. In one embodiment, process 400 is provided as computer-executable instructions for execution within a client device, using, for example, CSM 271 and/or integrity manager 272 of FIG. 2.

In any event, a client device may send a request for digital content to be streamed to the client device. In one embodiment, the digital content may be streamed over a network to the client device. As such, process 400 may begin, after a start block, at decision block 402, where a determination is made as to whether a new stream of digital content is requested. That is, in one embodiment, a determination is made whether the digital content is being received at a beginning of the content stream, dr within some other place within the stream. If so it is at the beginning of the content stream, then processing flows to block 404; otherwise, processing flows to decision block 422.

At block 404, at least one stream of digital content is received. As discussed herein, the at least one stream of digital content may be a single stream of content, where at least a first portion of the stream is unencrypted, and an other portion of the stream of digital content is encrypted. However, as discussed below, the at least one stream of digital content may include at least two digital streams of content, where one stream is unencrypted, and another stream is encrypted. This may be achieved, for example, by enabling multiple streams to be received concurrently, e.g., using different network addresses, paths, or the like, for access to the content. However, other mechanisms may also be employed, including, but not limited to interleaving multiple streams and having the interleaved stream received by the client device. Thus, embodiments are not limited in how the at least one stream of digital content may be provided to or otherwise received by the client device. In any event, by receiving a portion of the digital content stream that is initially unencrypted, delays that might arise based on license negotiations, and/or key negotiations, key access, and/or content decryption, can be eliminated, as the unencrypted portion would likely not require such actions.

Thus, as illustrated in FIG. 4, process 400 may perform multiple actions concurrently. Process 400 flows to both blocks 406 and 410. Thus, although described below in a serial manner, it should be understood, that blocks 406 and 408, and potentially decision block 416 may be performed at a same time as block 410, 412, and 414.

At block 406, the at least a portion of the received digital content that is unencrypted is readied for play. In one embodiment, such actions may include, but are not limited to decompressing or otherwise decoding, and formatting the received content for play at the client device. Moving to block 408 as the unencrypted content is received and readied for play, portions of the content that is readied for play is then played by the client device at block 408. Thus, streaming content may be readied for play, while other portions of the unencrypted content that is already to play may be played.

Processing then moves to decision block 416 where a determination is made whether the at least one portion of encrypted digital content is decrypted and readied for play. When it is determined that the encrypted digital content is not ready for play, processing may loop back to block 404, to continue to receive the at least one stream of digital content. When the encrypted digital content is ready for play, processing flows to block 418.

At block 410, while the unencrypted portion of the at least one stream of digital content is prepared and is playing, license/key negotiations may be performed. That is, the client device may negotiate with another device, or even a component within the client device, to receive access to a content decryption key or keys, and/or a license for access to the digital content. Processing flows next to block 412, where the content decryption key(s) may then be used to decrypt at least the received portion of encrypted digital content in the at least one stream. Moving next to block 414, as portions of the encrypted digital content is decrypted, other decrypted portions are readied to play, as described above in conjunction with block 408. When some of the decrypted content is readied for play, then processing may flow to block 418, based on an affirmative response at decision block 416.

At block 418, actions are performed to determine a location in the playing content that coincides with a location in the decrypted digital content that is ready for play. That is, frame alignments may be performed to achieve a seamless transition from playing of the unencrypted content to playing of the decrypted content.

As discussed above, a user of a client device may perceive a minimal, if any, interruption, in the playing of the digital content. However, where the unencrypted content may have been provided at a lower resolution, quality, bit rate, or the like, the now playing decrypted content may provide an improved resolution, quality, bit rate, which may be perceived by an end user.

In any event, processing flows to decision block 420, where a determination is made whether the playing of the content is to be terminated. This may be based on receiving an input from an end-user, receiving an end of the content, or the like. In any event, when termination of playing of the content is detected, processing may return to another process, where actions may be performed to terminate the play of the content.

As discussed above, playing of the digital content may start with the received unencrypted content, and then seamlessly switch to the decrypted content for play. The decrypted content may continue to play until any of a variety of events occur, including, for example, receiving indications that a decryption key rotation is to be performed, a request is received to relocate or seek to another location within the content, or the like.

Decryption key rotations may arise, where different portions of the received encrypted content are encrypted using different encryption keys. Key renegotiations and/or license re-negotiations may be again performed. Similarly, when a request is received to seek to relocate and play the content stream at a different location, an interruption in play may result. However, just as it is desired to minimize a time to a first frame to play the content, it is desirable to minimize a time to play the content upon relocation to another location within the content.

Figure 5:
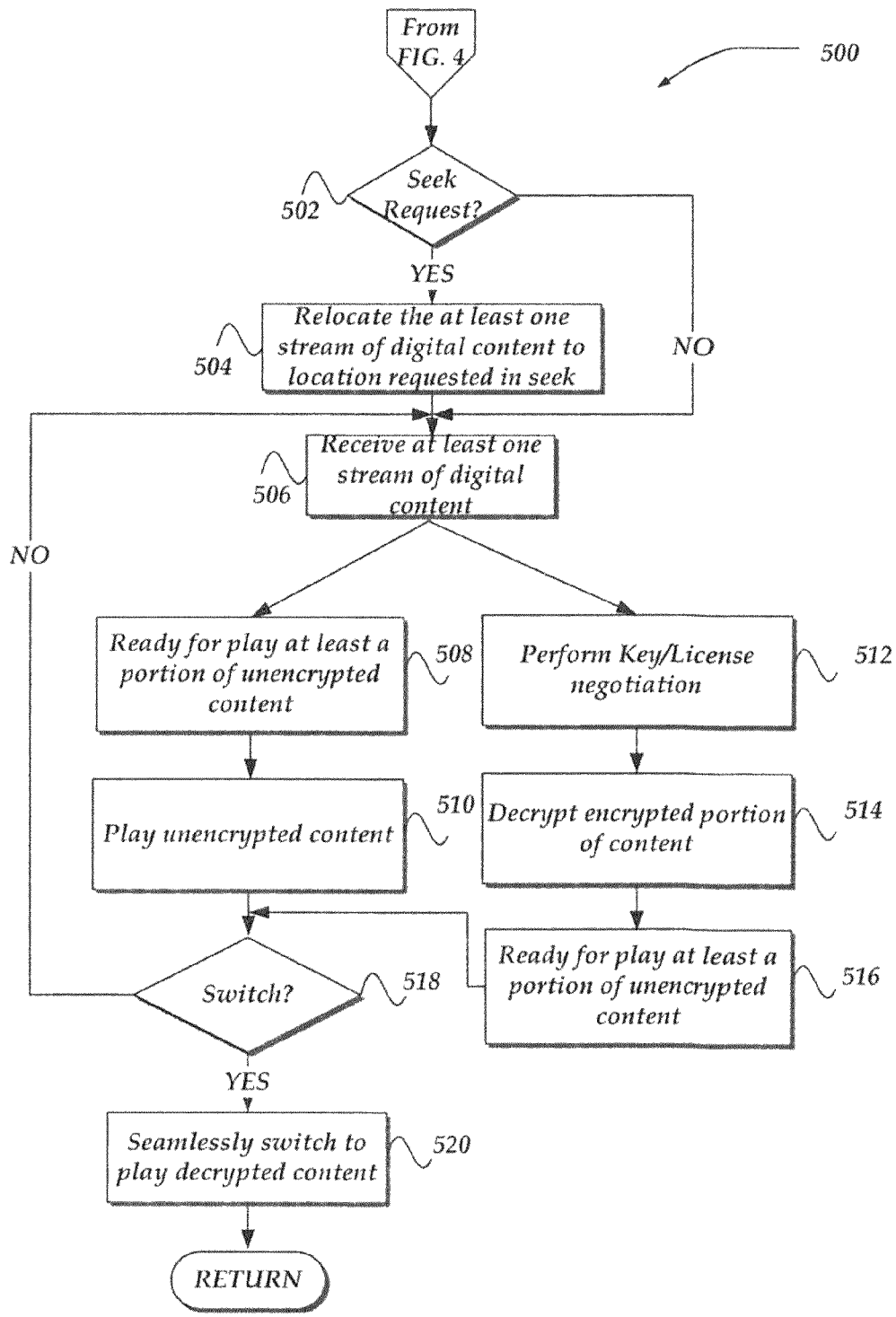
FIG. 5 illustrates one embodiment of a flow diagram usable to manage seek or key rotations for content streams.

Thus, FIG. 5 illustrates one embodiment of a flow diagram usable to manage seek or key rotations for content streams. As shown, process 500 may be performed when decision block 422 of process 400 of FIG. 4 indicates that a seek request or key rotation is to be performed. When neither is to be performed, then processing of process 400 may instead flow to block 424, where the content is continued to be streamed to the client device. At this juncture, it juncture, processing may flow to block 412, to continue processing for play the received encrypted content.

Process 500, begins at decision block 502, where a determination is made whether a seek request is received. In one embodiment, seeks may be performed to relocate the content for play based on any of a predefined location within the content, including based on bookmarks, predefined chapter section starts, defined frame locations, user selected/ cursor point, or the like. Thus, the use of the term "frame" herein includes seeking based on any of variety of criteria to a location with the digital content.

In any event, when the request is to a seek to relocate, processing flows to block 504; otherwise, it is determined that renegotiations of key(s) is to be performed. In that instance, processing may flow to block 506.

At block 502, actions are taken to enable the content to be relocated based on the seek request. As noted, in one embodiment, seek locations may be pre-defined by a content provider, content producer, or the like. Seek locations may be defined based on an end-user bookmark, as well. Moreover, when the at least one content stream includes multiple content streams, the seek relocation may be performed on each of the multiple content streams. In addition, seeks may be to a location where at least another portion of the content stream is found to be unencrypted. Thus, minimal delays may be obtained to restart play from the relocated position, by initiating play at the relocated position using the unencrypted content.

Processing flows to block 506, where the at least one stream of digital content is received. Processing then follows substantially similar flows as discussed above in process 400. That is blocks 508, 510, and 518 perform actions substantially similar to those in corresponding blocks 406, 408, and 416 of FIG. 4. Similarly, blocks 512, 514, and 516 perform actions substantially similar to those in corresponding blocks 410, 412, and 414 of FIG. 4. Further, based on the determination at decision block 518, processing may loop back to 506, or flow to block 520, where, similar to block 418 of FIG. 4, the decrypted content stream may seamlessly replace playing of the unencrypted content stream. Process 500 may then return to a calling process.

Although not discussed in the processes above, blocks 410 and 512 of FIGS. 4 and 5, respectively, other actions may also be performed. For example, in addition to any key and/or license negotiations (or re-negotiations), an integrity of at least some of the client device may be checked. However, in another embodiment, such integrity evaluations may be done concurrent with, and/or outside of processes 400 and/or 500. That is, integrity manager may perform constant, or scheduled, or even unscheduled monitoring of various components within the client device, including portions of the received digital content stream(s), to determine whether integrity of any one or more of the monitored components is compromised. The integrity manager may then provide processes 400 and/or 500 indication of such integrity compromise. Processes 400/500 may then elect to perform actions, including terminating decrypting, decoding, and/or even providing for play content. Moreover, in one embodiment, keys, licenses, and/or content may be blocked from access, destroyed, or otherwise invalidated for further use.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

Non-Limiting, Non-Exhaustive Examples of Digital Content Streams

Figure 6:
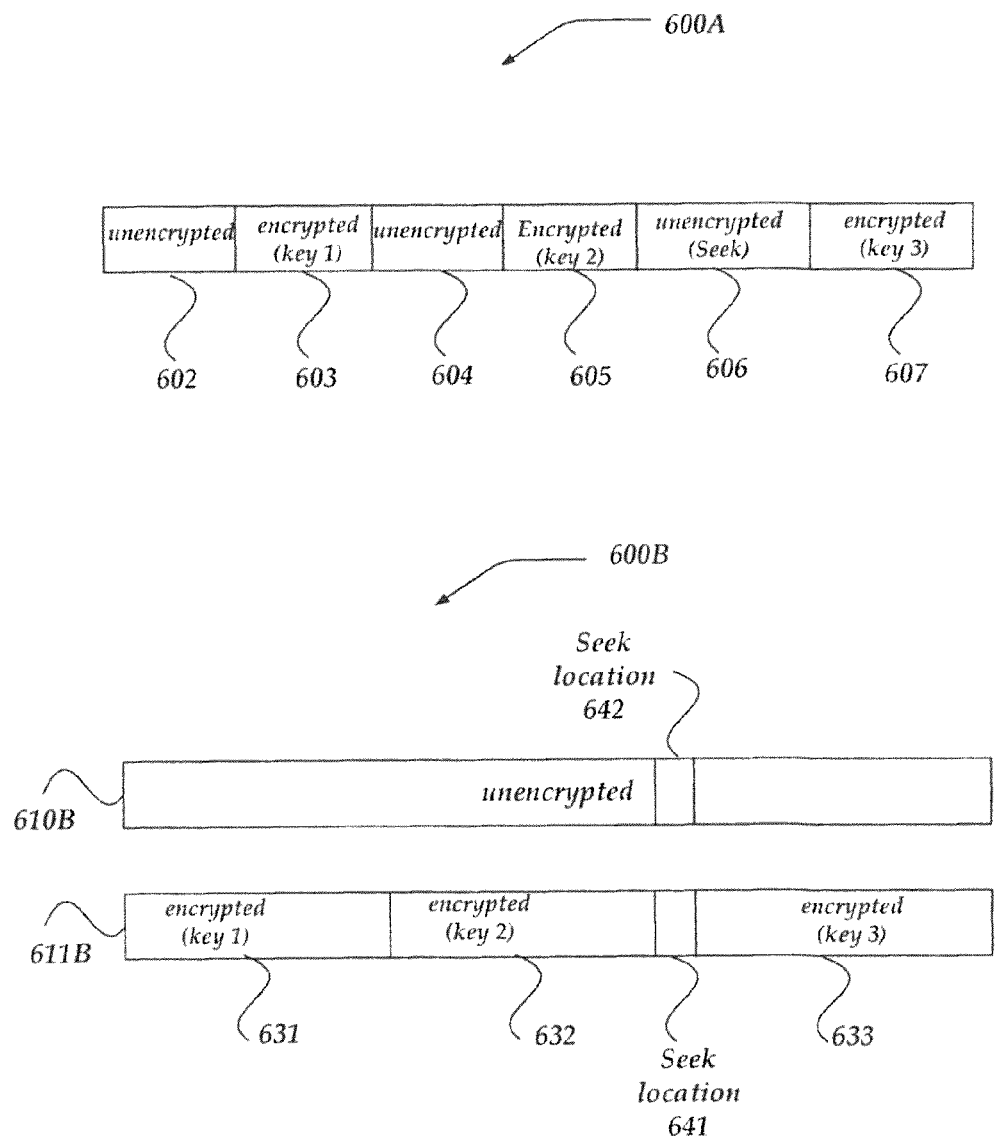
FIG. 6 illustrates non-limiting, non-exhaustive examples of different embodiments of content streams usable for practicing various embodiments.

FIG. 6 illustrates non-limiting, non-exhaustive examples of different embodiments of content streams usable for practicing various embodiments. Example stream 600A illustrates a non-limiting example where the at least one stream of digital content represents a single stream. As shown, at least an initial portion 602 of stream 600A that is unencrypted. Also illustrated are other portions of encrypted content (603, 605, and 607). Stream 600A further shows for locations having a possible key renegotiation, such as between portions 602 and 605, or between portions 605 and 607, are unencrypted portions, 604 and 606, respectively. Thus, when key renegotiations are to be performed, a transition may be performed back to playing unencrypted content. Further shown, for seek positions, an unencrypted portion, such as portion 606 may be played, until the encrypted portion corresponding to the seek location is decrypted and ready for play. This may be accomplished in any of a variety of ways. For example, in one embodiment, portions 606 and 607 may include the same digital content, varying-based on whether or not it is encrypted, and optionally based on a quality, resolution, or the like. In one embodiment, degradation of such features might not be performed over all of the unencrypted portions, and might merely be performed selectively. In any event, while portion 606 is playing, portion 607 is decrypted and readied for play. Any key/license negotiations for portion 607 may also be performed while portion 606 is playing.

Example 600B includes at least one stream of digital content, wherein two streams are illustrated, stream 610B and 611B. As shown, stream 610B may be unencrypted, while stream 611B is encrypted. Moreover, as further shown, stream 611B may include a plurality of different portions, 631-633, where different portions may be encrypted with different encryption keys. Shown in streams 610B and 611B are also seek locations 641 and 642. When a seek is performed, each of the streams are relocated to seek locations. The unencrypted portions of stream 610B following the seek location may then be readied and played, until the encrypted portions of stream 611B following the seek location is decrypted and readied for play.

It should be noted that while streams 610B and 611B are illustrated as separate streams, which may be accessed using different network addresses, port numbers, or the like, streams 610B and 611B may also be provided to a client device in an interleaved format. Thus, illustrations of FIG. 6 are not to be construed as limiting, but merely illustrations showing possible implementations.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device, comprising:
   a network interface to receive content over a network; and
   one or more processors that perform steps, comprising:
      receiving at least one stream of digital content including an encrypted portion and an unencrypted portion;
      playing the unencrypted portion of the at least one stream of digital content while performing a license negotiation operation with another device to produce a content decryption key;
      performing a decryption operation on the encrypted portion of the at least one stream of digital content using the content decryption key to generate decrypted digital content;
      determining a location within the decrypted digital content having a video frame aligning with a video frame at a location in the unencrypted portion of the digital content; and
      seamlessly switching play of the unencrypted portion of the at least one stream of digital content to play of the decrypted digital content at the determined location within the decrypted digital content.

2. The client device of claim 1, further comprising:
   receiving a request to seek to relocate and play the at least one stream of digital content at a location other than at a beginning of the at least one stream of digital content;
   responsive to receiving the request to seek, switching play of the decrypted digital content to play of a location within the unencrypted portion of the at least one stream of digital content corresponding to the requested location;
   playing the unencrypted portion of the at least one stream of digital content corresponding to the requested location while performing a license negotiation operation with another device to produce a content decryption key;
   performing a decryption operation on the encrypted portion of the at least one stream of digital content corresponding to the requested location using the content decryption key to produce decrypted digital content until the encrypted portion of the at least one stream of digital content corresponding to the requested location is decrypted and ready for play; and
   seamlessly switching play of the unencrypted portion of the at least one stream digital content corresponding to the requested location to play of the decrypted portion of the at least one stream of digital content corresponding to the requested location when the at least one stream of digital content corresponding to the requested location is ready to play.

3. The client device of claim 2, wherein the location other than at a beginning comprises defined seek locations including at least one of a chapter start, chapter end, bookmarked location, or scene change location.

4. The client device of claim 1, further comprising:
   detecting a key rotation occurring during playing of a location in the decrypted digital content;
   responsive to detecting the key rotation, switching to playing at a location within the unencrypted portion of the at least one stream of digital content corresponding to the location in the decrypted digital content at which the key rotation occurred; and
   responsive to completion of the key rotation, seamlessly switching to playing the decrypted digital content.

5. A computer-implemented method comprising:
   receiving at least one stream of digital content including an encrypted portion and an unencrypted portion;
   playing the unencrypted portion of the at least one stream of digital content while performing a license negotiation operation with another device to produce a content decryption key;
   performing a decryption operation on the encrypted portion of the at least one stream of digital content using the content decryption key to generate decrypted digital content;
   determining a location within the decrypted digital content having a video frame aligning with a video frame at a location in the unencrypted portion of the digital content; and
   seamlessly switching play of the unencrypted portion of the at least one stream of digital content to play of the decrypted digital content at the determined location within the decrypted digital content.

6. The method of claim 5, further comprising:
   detecting a key rotation occurring during playing of a location in the decrypted digital content;
   responsive to detecting the key rotation, switching to playing at a location within the unencrypted portion of the at least one stream of digital content corresponding to the location in the decrypted digital content at which the key rotation occurred; and
   responsive to completion of the key rotation, seamlessly switching to playing the decrypted digital content.

7. The method of claim 5, further comprising:
   receiving a request to seek to relocate and play the at least one stream of digital content at a location other than at a beginning of the at least one stream of digital content;

responsive to receiving the request to seek, switching play of the decrypted digital content to play of a location within the unencrypted portion of the at least one stream of digital content corresponding to the requested location;

playing the unencrypted portion of the at least one stream of digital content corresponding to the requested location while performing a license negotiation operation with another device to produce a content decryption key;

performing a decryption operation on the encrypted portion of the at least one stream of digital content corresponding to the requested location using the content decryption key to produce decrypted digital content until the encrypted portion of the at least one stream of digital content corresponding to the requested location is decrypted and ready for play; and seamlessly switching play of the unencrypted portion of the at least one stream digital content corresponding to the requested location to play of the decrypted portion of the at least one stream of digital content corresponding to the requested location when the at least one stream of digital content corresponding to the requested location is ready to play.

8. A non-transitory computer readable storage medium, having computer-executable instructions stored thereon, comprising computer program instructions for:

receiving at least one stream of digital content including an encrypted portion and an unencrypted portion;

playing the unencrypted portion of the at least one stream of digital content while performing a license negotiation operation with another device to produce a content decryption key;

performing a decryption operation on the encrypted portion of the at least one stream of digital content using the content decryption key to generate decrypted digital content;

determining a location within the decrypted digital content having a video frame aligning with a video frame at a location in the unencrypted portion of the digital content; and seamlessly switching play of the unencrypted portion of the at least one stream of digital content to play of the decrypted digital content at the determined location within the decrypted digital content.

9. The computer-readable storage medium of claim 8, further comprising computer program instructions for:

receiving a request to seek to relocate and play the at least one stream of digital content at a location other than at a beginning of the at least one stream of digital content;

responsive to receiving the request to seek, switching play of the decrypted digital content to play of a location within the unencrypted portion of the at least one stream of digital content corresponding to the requested location;

playing the unencrypted portion of the at least one stream of digital content corresponding to the requested location while performing a license negotiation operation with antoher device to produce a content decryption key;

performing a decryption operation on the encrypted portion of the at least one stream of digital content corresponding to the requested location using the content decryption key to produce decrypted digital content until the encrypted portion of the at least one stream of digital content corresponding to the requested location is decrypted and ready for play; and seamlessly switching play of the unencrypted portion of the at least one stream digital content corresponding to the requested location to play of the decrypted portion of the at least one stream of digital content corresponding to the requested location when the at least one stream of digital content corresponding to the requested location is ready to play.

10. The computer-readable storage medium of claim 9, wherein the location other than at a beginning comprises defined seek locations including at least one of a chapter start, chapter end, bookmarked location, or scene change location.

11. The computer-readable storage medium of claim 8, further comprising computer program instructions for:

detecting a key rotation occurring during playing of a location in the decrypted digital content;

responsive to detecting the key rotation, switching to playing at a location within the unencrypted portion of the at least one stream of digital content corresponding to the location in the decrypted digital content at which the key rotation occurred; and responsive to completion of the key rotation, seamlessly switching to playing the decrypted digital content.

12. The client device of claim 1, further comprising:

checking integrity of the client device while playing the unencrypted portion of the at least one stream of digital content; and terminating the decryption operation responsive to the integrity check indicating that the client device is compromised.

\* \* \* \* \*